(12) United States Patent
Shin

(10) Patent No.: US 7,064,917 B2
(45) Date of Patent: Jun. 20, 2006

(54) METHOD AND APPARATUS FOR CONTROLLING DISC DRIVE USING COUNTER-ELECTROMOTIVE FORCE

(75) Inventor: Sang-chul Shin, Osan-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 98 days.

(21) Appl. No.: 10/649,779

(22) Filed: Aug. 28, 2003

(65) Prior Publication Data

US 2004/0051993 A1    Mar. 18, 2004

(30) Foreign Application Priority Data

Aug. 28, 2002    (KR)    ...................... 10-2002-0051162

(51) Int. Cl.
*G11B 21/12*    (2006.01)

(52) U.S. Cl. ........................................................ 360/75

(58) Field of Classification Search .................. 360/75, 360/77.03, 78.11; 318/459
See application file for complete search history.

(56) References Cited

U.S. PATENT DOCUMENTS

| | | | |
|---|---|---|---|
| 5,654,840 A | | 8/1997 | Patton et al. |
| 6,236,527 B1 | | 5/2001 | Uchiike et al. |
| 6,700,344 B1 | * | 3/2004 | Krishnamoorthy et al. . 318/461 |
| 2003/0103286 A1 | * | 6/2003 | Bi et al. ........................ 360/60 |
| 2003/0174429 A1 | * | 9/2003 | Heydt et al. .................. 360/75 |

FOREIGN PATENT DOCUMENTS

JP    7-6488    1/1995

OTHER PUBLICATIONS

"Quiescent Active Retract System for Disk File," Nov. 1, 1996, IBM TDB vol. 39, No. 11, pp. 181-182.*
European Search Report dated Jan. 17, 2006 for European Application No. 03019401.3.

* cited by examiner

*Primary Examiner*—David Hudspeth
*Assistant Examiner*—James L Habermehl
(74) *Attorney, Agent, or Firm*—Staas & Halsey LLP

(57) ABSTRACT

A method and an apparatus to control a disc drive, and more particularly, a method and an apparatus to control a disc drive using a counter-electromotive force, prevents collision and malfunction of a transducer and a disc by determining external vibrations and magnitude of a shock without installing an additional shock sensor in the disc drive. The method of controlling the disc drive using a counter-electromotive force includes detecting a voltage applied to a voice coil during a predetermined mode, performing an operation of a value of the counter-electromotive force using the detected voice coil voltage comparing the value of the counter-electromotive force operated with a predetermined threshold, and when the value of the counter-electromotive force is equal to or larger than the predetermined threshold, controlling a voice coil motor and a spindle motor so that a current mode is stopped and a parking or unloading mode is executed.

23 Claims, 6 Drawing Sheets

METHOD AND APPARATUS FOR CONTROLLING DISC DRIVE USING COUNTER-ELECTROMOTIVE FORCE

CROSS-REFERENCE TO RELATED APPLICATIONS

This applicationclaims the priority of Korean Patent Application No. 2002-51162, filed on Aug. 28, 2002, in the Korean Intellectual Property Office, the disclosure of which is incorporated herein in its entirety by reference.

BACKGROUND OF THE INVENTION

1. Field of the Invention

The present invention relates to a method and an apparatus to control a disc drive, and more particularly, to a method of controlling and an apparatus to control a disc drive using a counter-electromotive force, which prevents collision and malfunction of a transducer and a disc by determining external vibrations and a magnitude of shock without installing an additional shock sensor in the disc drive.

2. Description of the Related Art

A hard disc drive includes a plurality of magnetic transducers which sense a magnetic field and magnetize a single rotating disc or each of a plurality of rotating discs to write and read information on and from the disc. In general, the information is formatted in a plurality of sectors in circular tracks. There is a number of tracks across each surface of a disc. Tracks located above each other on the plurality of rotating discs are grouped into cylinders. Therefore, each track is also defined by a cylinder.

In general, each of the transducers is integrated into a slider incorporated into a head gimbal assembly (HGA). Each HGA is attached to an actuator arm. The actuator arm has a voice coil adjacent to a certain magnetic assembly, together with a voice coil motor. In general, the hard disc drive includes a driving circuit which supplies current used to excite the voice coil motor, and a controller. The excited voice coil motor rotates the actuator arm and moves each of the transducers across surfaces of the discs.

When the information is written or read, there is a feasibility that the hard disc drive performs a seek routine when each of the transducers is moved from one cylinder to another cylinder. During the seek routine, the voice coil motor is excited by a current used to move each of the transducers to a new position on the surface of a disc. Also, the controller executes a servo routine on which each of the transducers is moved to an accurate position of a cylinder with respect to a center of a track.

The hard disc drive is very sensitive to disturbance caused by external shocks. As such, when the disturbance exceeds a tolerance range of the hard disc drive, a malfunction may occur, and when the disturbance is severe, a collision between a transducer and disc surface may occur such that the transducer or disc may be severely damaged.

A well-known technique of protecting a disc drive from disturbance is disclosed in U.S. Pat. No. 6,236,527 titled "Disk Drive with Actuator Load/Unload Controller."

As shown in FIG. 1, the disc drive disclosed in U.S. Pat. No. 6,236,527 includes a shock sensor 140, a ramp 6 as a load/unload mechanism to load/unload a disc 1, A/D converters 130b and 140b which convert an analog signal into a digital signal, an actuator velocity detecting circuit 130a, a CPU 100 which determines and executes commands, a VCM driver 120 which drives an actuator, and a spindle driver 110 which drives a spindle motor 2 to rotate the disc 1. The disc drive also includes the actuator 3 as a position tracking driving unit to write and read data on and from the disc 1, a head/slider 4 that writes data on the disc 1 and reads data from the disc 1, and a VCM coil 5 which drives the actuator 3.

The head/slider 4 that writes and reads data on and from the disc 1 and the VCM coil 5 are both mounted in the actuator 3. The VCM coil 5, together with a permanent magnet (not shown), constitutes a voice coil motor (VCM). The VCM moves the actuator 3, and the spindle motor 2 rotates the disc 1. When the head/slider 4 is unloaded, the ramp 6 supports a head arm. The actuator 3, the VCM, and the ramp 6 constitute a load/unload mechanism that loads/unloads the head/slider 4 onto/from the disc 1. The spindle driver 110 drives the spindle motor 2 according to commands from the CPU 100.

A feature of the disc drive disclosed in the above U.S. Pat. No. 6,236,527 is that after a shock signal input to the disc drive is sensed using the shock sensor 140 during loading/unloading of the head/slider 4, if the value of the sensed shock signal exceeds a threshold, driving of the actuator 3 is stopped, and the head/slider 4 is unloaded by forced driving without control of velocity so that the disc drive is protected from external shocks.

According to the above related art, an additional sensor should be added to sense the magnitude of an outside shock, increasing costs of the disc drive. In addition, only in the loading/unloading mode is the disc drive protected from the external shocks, but the disc drive cannot be protected from smaller disturbance occurring in a high frequency region during the seek and track following modes.

SUMMARY OF THE INVENTION

Accordingly, it is an aspect of the present invention to provide a method and an apparatus to control a disc drive using a counter-electromotive force, in which a magnitude of an external shock applied to the disc drive is determined from the counter-electromotive force by using a signal applied to a voice coil or a position error signal without an additional shock sensor. A servo mechanism of the disc drive is controlled according to the determined magnitude of the external shock.

Additional aspects and advantages of the invention will be set forth in part in the description which follows and, in part, will be obvious from the description, or may be learned by practice of the invention.

The foregoing and/or other aspects of the present invention are achieved by providing a method of controlling a disc drive using a counter-electromotive force. The method includes detecting a voltage applied to a voice coil during a predetermined mode, performing an operation of a value of the counter-electromotive force using the detected voice coil voltage, comparing the value of the counter-electromotive force operated with a predetermined threshold, and when the value of the counter-electromotive force is equal to or larger than the predetermined threshold, controlling a voice coil motor and a spindle motor so that a current mode is stopped and a parking or unloading mode is executed.

The foregoing and/or other aspects of the present invention are achieved by providing a method of controlling a disc drive using a counter-electromotive force. The method includes detecting a moving distance variation $\Delta Lh/\Delta t$ of a transducer with respect to a variation in time during a predetermined mode, performing an operation of a value of the counter-electromotive force by applying the detected moving distance variation ΔLh/Δt of the transducer with respect to the variation in time to a predetermined counter-electromotive force calculation Equation, comparing the value of the counter-electromotive force with a predetermined threshold, and when the value of the counter-electromotive force is equal to or larger than the predetermined threshold, controlling a voice coil motor and a spindle motor so that a current mode is stopped and a parking or unloading mode is executed.

The foregoing and/or other aspects of the present invention are achieved by providing a disc drive including a disc having a surface, a spindle motor to rotate the disc, a transducer to write and read information in and from the disc, a voice coil motor to move the transducer, and a controller to control the spindle motor and the voice coil motor according to a set mode, and to perform a shock damage prevention process of controlling the voice coil motor and the spindle motor, so that a current mode is stopped and a parking or unloading mode is executed if a counter-electromotive force operation process of performing an operation of a value of a counter-electromotive force using a voltage detected from the voice coil and the value of the counter-electromotive are equal to or larger than a predetermined threshold value.

The foregoing and/or other aspects of the present invention are achieved by providing a disc drive including a disc having a surface, a spindle motor to rotate the disc, a transducer to write and read information in and from the disc, a voice coil motor to move the transducer, and a controller to control the spindle motor and the voice coil motor according to a set mode, and using a moving distance variation ΔLh/Δt of the transducer with respect to a variation in time detected during the set mode Δt, to perform a shock damage prevention process of controlling the voice coil motor and the spindle motor so that a current mode is stopped and a parking or unloading mode is executed if a counter-electromotive force operation process of performing an operation of the value of a counter-electromotive force using a predetermined counter-electromotive force calculation Equation and the value of the counter-electromotive force of which operation is performed in the counter-electromotive force operation process are equal to or larger than a predetermined threshold value.

BRIEF DESCRIPTION OF THE DRAWINGS

The above and/or other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
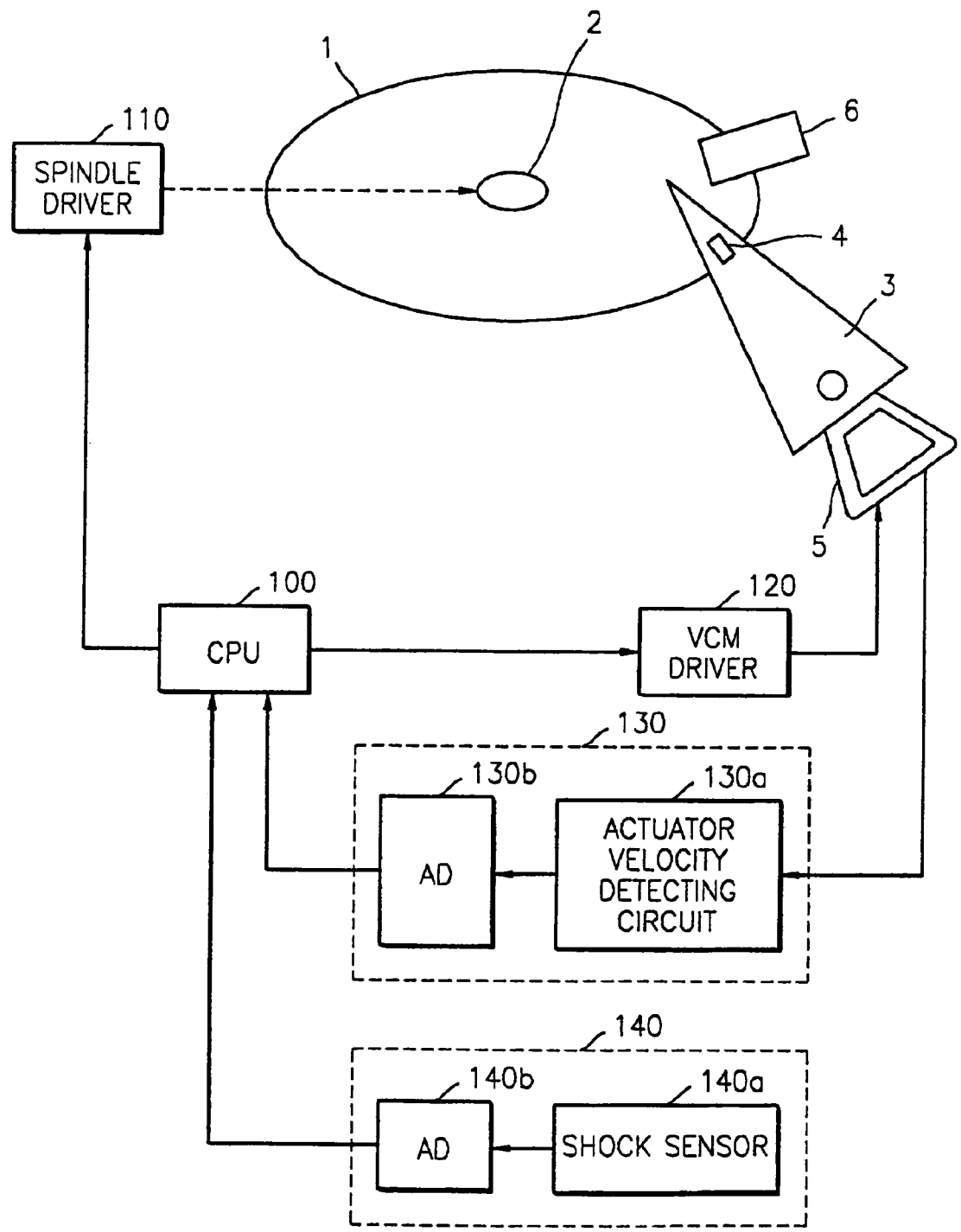
FIG. 1 shows a structure of a conventional disc drive including a shock sensor.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 2:
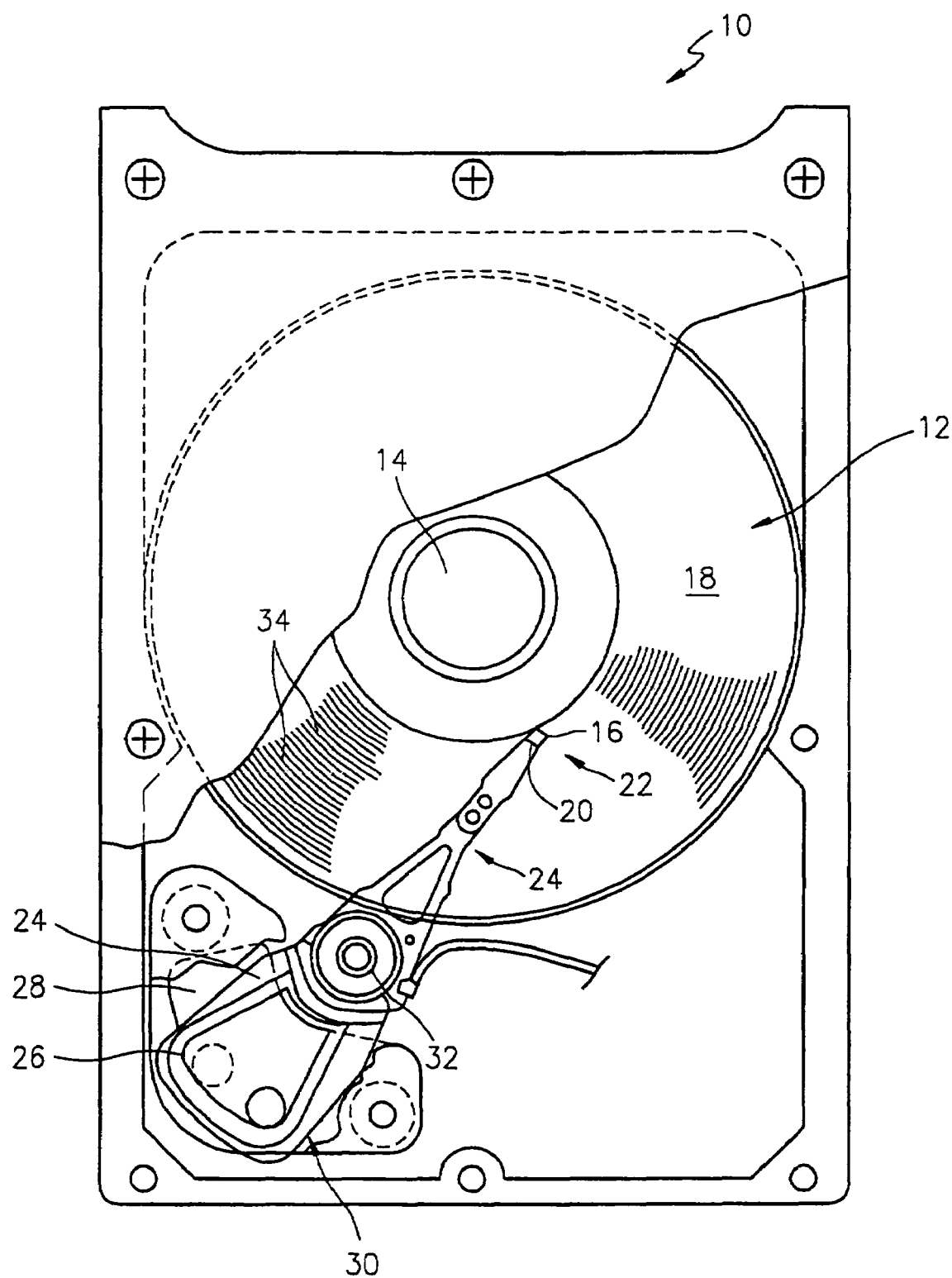
FIG. 2 shows a top view of a disc drive, according to an embodiment of the present invention.

FIG. 2 shows a top view of a disc drive, according to an embodiment of the present invention. A drive 10 includes at least one magnetic disc 12 rotated by a spindle motor 14. The drive 10 further includes a transducer 16 adjacent to a disc surface 18.

The transducer 16 senses a magnetic field and magnetizes the disc 12 to read/write information from/on the rotating disc 12. In general, the transducer 16 is coupled with the disc surface 18. Although a single transducer 16 is shown, the transducer 16 includes a writing transducer to magnetize the disc 12 and a separated reading transducer to sense the magnetic field of the disc 12. The reading transducer includes a magneto-resistive (MR) device.

The transducer 16 may be integrated into a slider 20. The slider 20 is designed to generate an air bearing between the transducer 16 and the disc surface 18. The slider 20 is coupled with a head gimbal assembly (HGA) 22. The HGA 22 is attached to an actuator arm 24 having a voice coil 26. The voice coil 26 allows a voice coil motor (VCM) 30 to be adjacent to a magnetic assembly 28. Current flowing through the voice coil 26 causes a torque used to rotate the actuator arm 24 with respect to a bearing assembly 32. The rotation of the actuator arm 24 causes the transducer 16 to move across the disc surface 18.

Generally, information is stored in a circular track 34 of the disc 12 and, each track 34 includes a plurality of sectors. Each of the sectors includes a data field and an identification field. The identification field includes a gray code used to identify a sector and a track (a cylinder). The transducer 16 is moved across the disc surface 18 so as to read/write information from/on another track. Moving the transducer 16 across another track is generally referred to as a seek routine.

Figure 3:
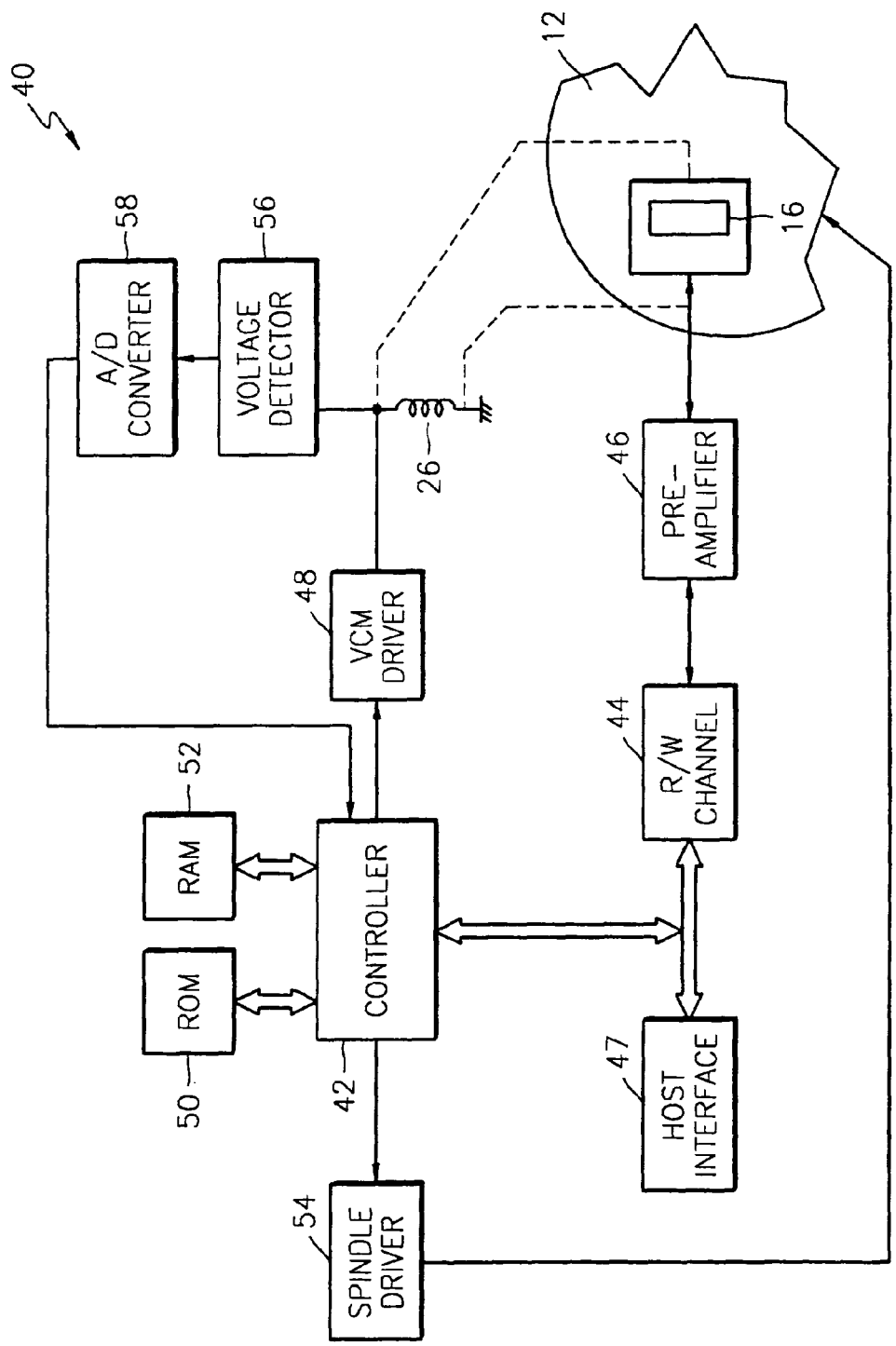
FIG. 3 shows a circuit diagram of an electrical system of controlling the disc drive shown in FIG. 2.

FIG. 3 shows a circuit diagram of an electrical system of controlling the disc drive shown in FIG. 2. An electrical system 40 includes a read/write (R/W) channel 44 and a controller 42 coupled with the transducer 16 by a pre-amplifier 46. The controller 42 includes a digital signal processor (DSP), a microprocessor, and a microcontroller. The controller 42 applies a control signal to the R/W channel 44 so as to read and write information from and on the disc 12. Information is transmitted to a host interface 47 from the R/W channel 44. The host interface 47 includes a buffer memory to allow the disc drive and a control circuit to interface with a system, such as a personal computer (PC).

Also, the controller 42 is coupled with a VCM driver 48 which supplies driving current to the voice coil 26. The controller 42 applies a control signal to the VCM driver 48 to control excitation of the VCM 30 and movement of the transducer 16.

In a read mode, the R/W channel 44 converts an analog signal read by the transducer 16 and amplified by the pre-amplifier 46 into a digital signal that may be read by a host computer (not shown), outputs the digital signal to the host interface 47, and receives user data output from the host computer from the host interface 47. In a write mode, the R/W channel 44 converts the user data into a recording current which may be written in the disc 12, and outputs the recording current to the pre-amplifier 46.

The controller 42 is also coupled with a read only memory (ROM) element or a nonvolatile memory element, such as a flash memory element 50, and a random access memory element 52. The memory elements 50 and 52 include a command used by the controller 42 and data so as to execute a software routine. The software routine includes the seek routine on which the transducer 16 is moved from one track to another track. The seek routine includes a servo control routine during which the transducer 16 is moved to a correct track.

Figure 4:
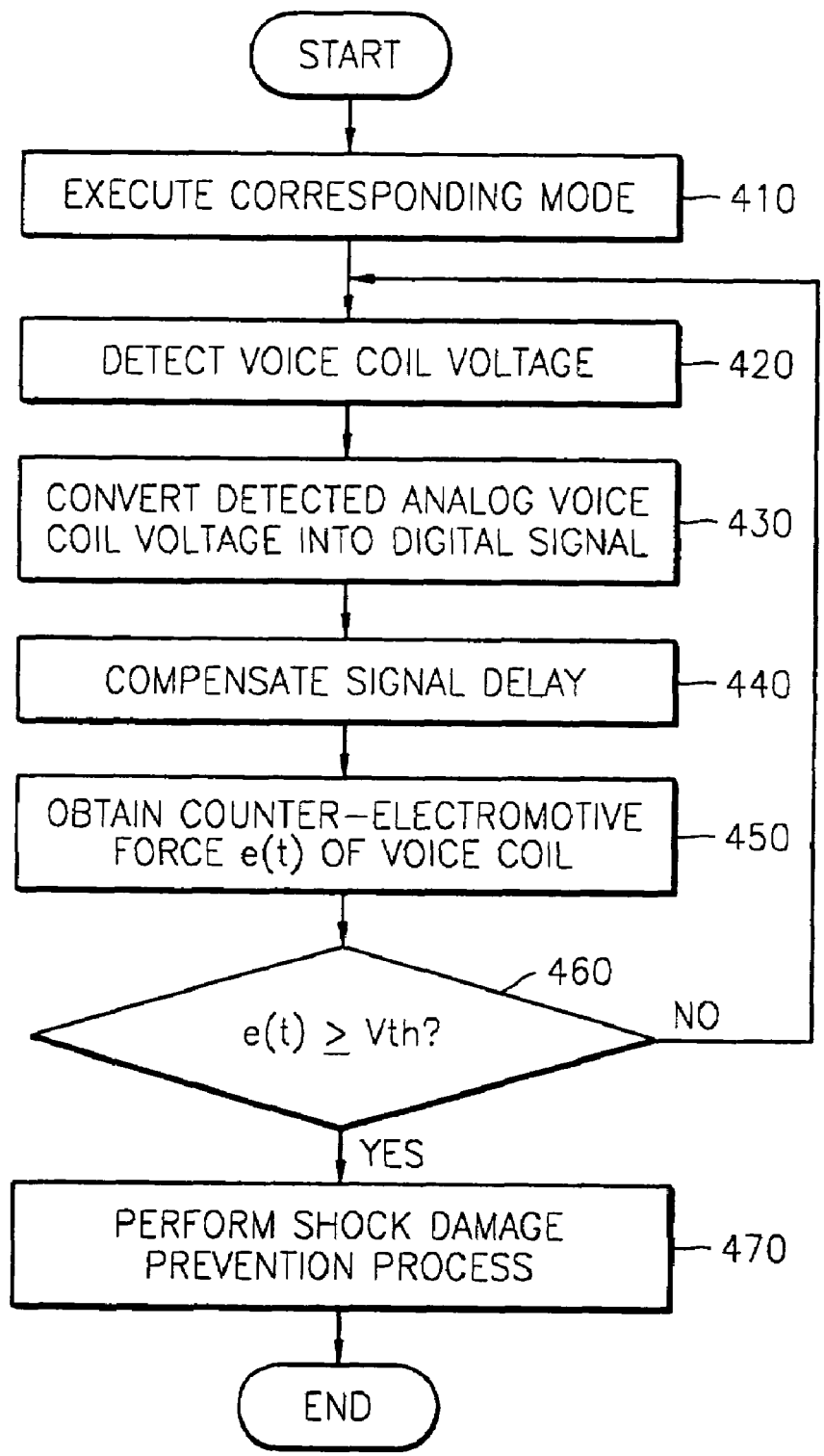
FIG. 4 shows a flowchart illustrating a method of controlling the disc drive using a counter-electromotive force according to an embodiment of the present invention.
Figure 5:
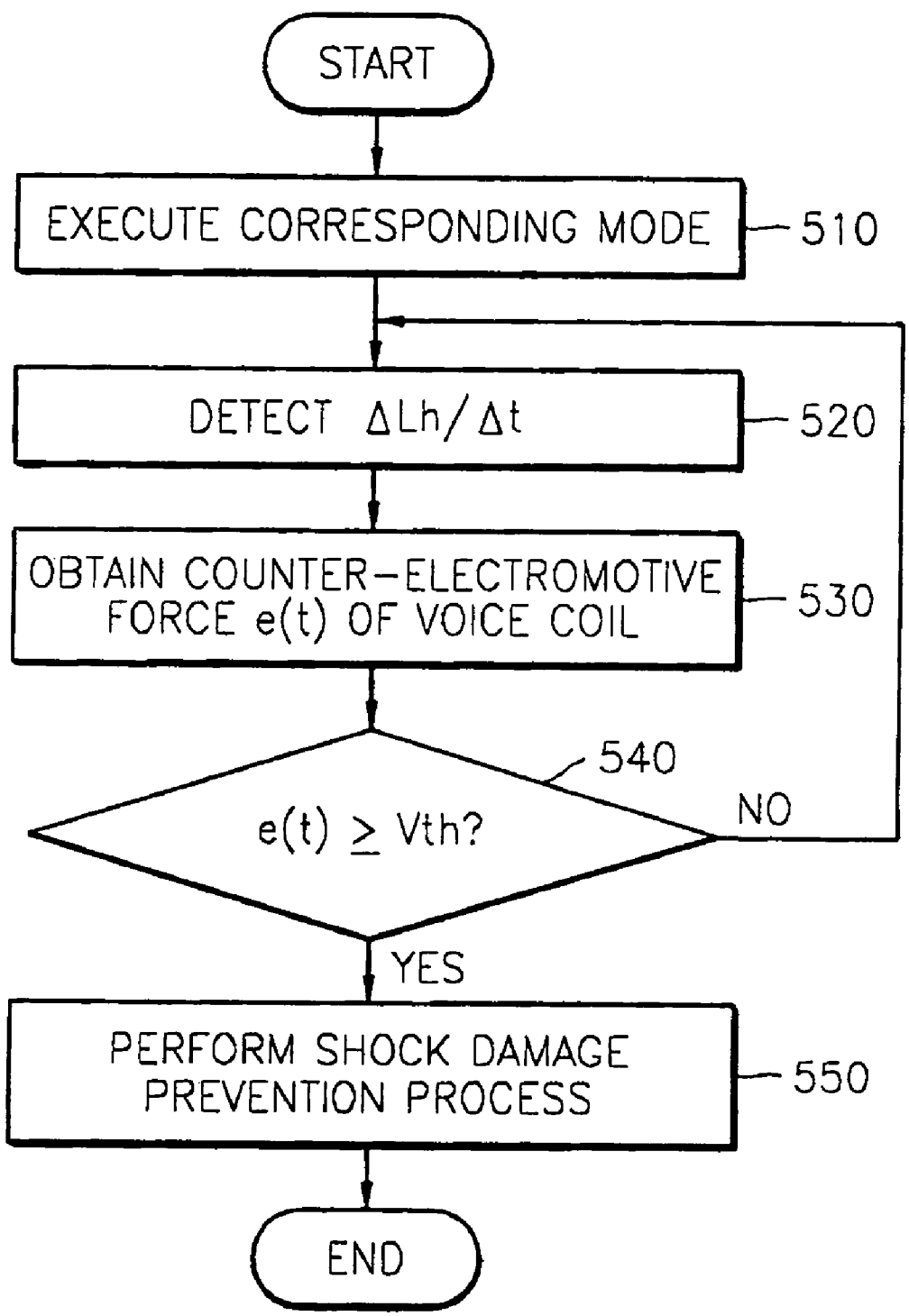
FIG. 5 shows a flowchart illustrating another method of controlling the disc drive using the counter-electromotive force according to an embodiment of the present invention.

Also, programs as described in the flowcharts illustrating a method of controlling a disc drive using a counter-electromotive force as shown in FIGS. 4 and 5 of the present invention, are stored in the memory elements 50 and 52.

In order to perform an operation of a counter-electromotive force using a voice coil voltage, according to an embodiment of the present invention, a voltage detector 56, which detects the voice coil voltage, and an analog/digital (A/D) converter 58, which converts the detected voice coil voltage into a digital signal, are provided. The controller 42 is designed to perform a shock damage prevention process by controlling the VCM 30 and the spindle motor 14 so that a current mode is stopped and a parking or unloading mode is executed if a counter-electromotive force operation process to perform an operation of a value of the counter-electromotive force using the voltage detected from the voice coil and the value of the counter-electromotive force, of which operation is performed in the counter-electromotive force operation process, are equal to or larger than a predetermined threshold value. Preferably, the voltage detector 56 is designed to include an amplifier and a filter to attenuate noise, because a signal detected using the counter-electromotive force is very small.

Next, in a method of detecting a counter-electromotive force using a servo signal according to another embodiment of the present invention, the voltage detector 56 and the analog/digital converter 58 are not needed. Here, the controller 42 is designed to calculate ΔLh/Δt, which is a moving distance variation ΔLh of the transducer with respect to a variation in time Δt, by analyzing the servo signal and to perform a shock damage prevention process of controlling the VCM 30 and the spindle motor 14, so that a current mode is stopped and a parking or unloading mode is executed if the counter-electromotive force operation process of performing an operation of the value of the counter-electromotive force using a predetermined counter-electromotive force calculation Equation and the value of the counter-electromotive force of which operation is performed in the counter-electromotive force operation process are equal to or larger than a predetermined threshold value.

Thus, the controller 42 calculates the counter-electromotive force using a position error signal, which is a servo signal or a voice coil voltage. If the calculated value of the counter-electromotive force is equal to or larger than a threshold level, the controller 42 determines that external shocks or vibrations exceed a tolerance range of a system, stops the current mode so as to protect the disc drive, and controls the servo mechanism to convert to a parking or unloading mode.

In addition, a delay time may occur between a driving signal output from the VCM driver 48 and a signal detected from the voice coil 26. Thus, in order to calculate correct counter-electromotive force, it is effective that a circuit to compensate for signal delay between the driving signal and a voltage detection signal from the voice coil 26 is installed in the controller 42.

Hereinafter, a method of controlling a disc drive using a counter-electromotive force according to the present invention will be described in detail.

First, a principle of the counter-electromotive force generated in the voice coil by disturbance is as follows. When disturbance, such as an external vibration or an external shock, occurs when a transducer reads or writes a signal along a certain track, the HGA 22 makes a small movement in a horizontal direction such that the voice coil 26 moves on the voice coil motor 30 in which a magnetic force is uniformly distributed. In this case, the voice coil 26 makes a fine vibration in a uniform magnetic force, thereby generating the counter-electromotive force.

A method of obtaining the counter-electromotive force includes using a voice coil voltage and using a position error signal.

First, a method of controlling a disc drive using a counter-electromotive force according to the embodiment of the present invention using a voice coil voltage will be described with reference to the flowchart of FIG. 4.

In operation 410, the controller 42 determines commands input to the host interface 47 and executes a corresponding mode. As an example, the controller 42 executes a loading mode, a seek mode, a track following mode, a read mode, and a write mode according to the commands.

In operation 420, a voltage is detected from the voice coil 26 while a current mode is executed. In operation 430, the detected analog voice coil voltage is converted into a digital signal.

However, a delay time may occur between a driving signal output from the VCM driver 48 and a signal detected from the voice coil 26. Thus, in order to calculate a correct counter-electromotive force, in operation 440, the delay between the driving signal and the voltage detection signal of the voice coil 26 is compensated by a delay circuit (not shown) installed in the controller 42.

In operation 450, a counter-electromotive force e(t) of the voice coil 26 is obtained by Equation 1.

$$e(t) = v(t) - L \times \left(\frac{di}{dt}\right) - R \times i(t) \quad (1)$$

Here, v(t) is a voltage detected from a voice coil, L is a reactance constant of the voice coil, R is a resistance toward the voice coil from the VCM driver, and i is current applied to the voice coil.

Next, in operation 460, the value of the counter-electromotive force of which the operation is performed in operation 450 is compared with a threshold Vth. Here, the threshold Vth is statistically determined by a maximum magnitude of a shock or the magnitude of vibration within a tolerance range of the system, according to a correlation between the counter-electromotive force and the magnitude of shock through experiments. That is, the threshold Vth is obtained from a regression function defined between an external shock or the magnitude of vibration and a voice coil counter-electromotive force from the correlation.

When the value of the operated counter-electromotive force is smaller than the threshold Vth as a result of comparison in operation 460, this case corresponds to the magnitude of shock or the magnitude of vibration within a tolerance range of the disc drive. Thus, a current mode is normally executed, returns to operation 420, an operation is iteratively performed on the value of the counter-electromotive force, and then the value of the counter-electromotive force is compared with the threshold Vth.

If the value of the operated counter-electromotive force is equal to or larger than the threshold Vth as a result of comparison in operation 460, the magnitude of an external shock or the magnitude of shock determined by the value of the operated counter-electromotive force exceeds the tolerance range of the disc drive. Thus, in operation 470, in order to prevent damages of the transducer and the disc due to collision with the transducer and the disc, a shock damage prevention process of controlling the VCM and the spindle motor is performed so that the current mode is stopped and a parking or unloading mode is executed. This is because it takes a predetermined time for disturbance to spread. Thus, the disturbance is prevented from being transferred to the transducer and the disc and from making a bad effect on the function of the disc drive.

Next, the method of controlling a disc drive using a counter-electromotive force according to the embodiment of the present invention using a position error signal will be described with reference to the flowchart in FIG. 5.

In this embodiment, the counter-electromotive force signal of the voice coil 26 is obtained using a variation in rotational speed of the transducer 16 based on a counter-electromotive constant Ke of the voice coil 26 determined in a design operation and the position error signal generated from the servo signal read by the transducer 16. In this method, the HGA 22 is assumed to be a rigid body. However, the transducer 16 is attached to a suspension, and the transducer 16 and the suspension are attached to the bearing assembly 32 such that the structure of the disc drive is more sensitive to disturbance and the method may be used even in a disturbance occurring in a high frequency region.

In operation 510, the controller 42 determines commands input to the host interface 47 and executes a corresponding mode. As an example, the controller 42 executes a loading mode, a seek mode, a track following mode, a read mode, and a write mode according to the commands.

Figure 6:
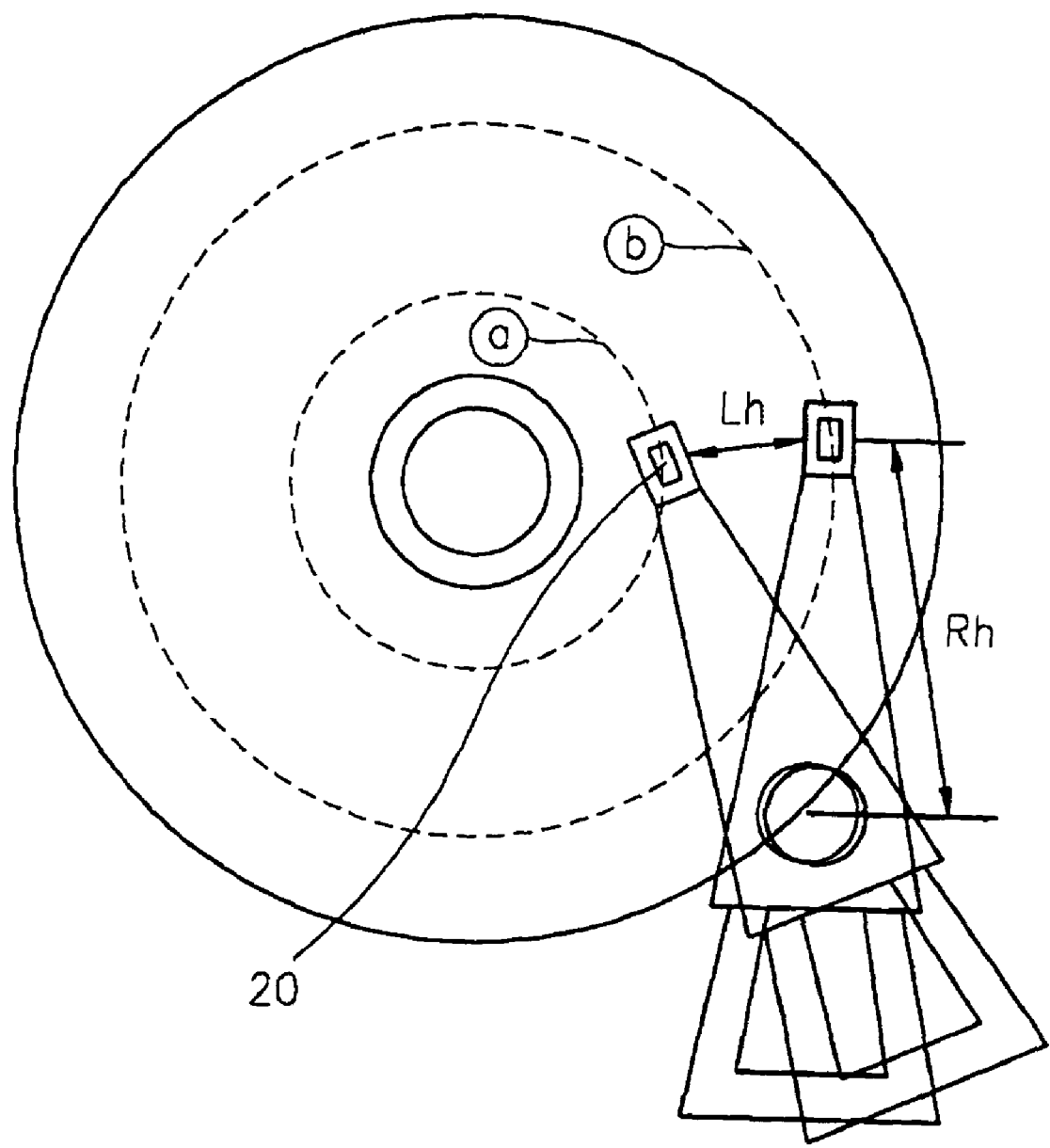
FIG. 6 shows a method of obtaining a counter-electromotive force from a position error signal.

In operation 520, the controller 42 detects ΔLh/Δt, which is a moving distance variation ΔLh of the transducer with respect to a variation in time Δt, using the position error signal as the servo signal when the transducer is moved from a track b to a track a as shown in FIG. 6.

In operation 530, a counter-electromotive force e(t) of the voice coil 26 is obtained by Equation 2.

$$e(t) = \left(\frac{Ke}{Rh}\right) \times \left(\frac{dLh}{dt}\right) \quad (2)$$

Here, Ke is a counter-electromotive force constant, and Rh is a distance from a pivot bearing to the transducer 16, as shown in FIG. 6.

In operation 540, the value of the counter-electromotive force of which operation is performed in operation 530 is compared with a threshold Vth. Here, the threshold Vth is statistically determined by a maximum magnitude of a shock or the magnitude of vibration within a tolerance range of the system, according to a correlation between the counter-electromotive force and the magnitude of shock through experiments. That is, the threshold Vth is obtained from a regression function defined between an external shock or the magnitude of vibration and a voice coil counter-electromotive force from the correlation.

When the value of the operated counter-electromotive force is smaller than the threshold Vth as a result of comparison in operation 540, this case corresponds to the magnitude of shock or the magnitude of vibration within a tolerance range of the disc drive. Thus, a current mode is normally executed, returns to operation 520, an operation is iteratively performed on the value of the counter-electromotive force, and then the value of the counter-electromotive force is compared with the threshold Vth.

If the value of the operated counter-electromotive force is equal to or larger than the threshold Vth as the result of comparison in operation 540, the magnitude of an external shock or the magnitude of shock determined by the value of the operated counter-electromotive force exceeds the tolerance range of the disc drive. Thus, in operation 550, in order to prevent damages of the transducer and the disc due to collision with the transducer and the disc, a shock damage prevention process of controlling the VCM and the spindle motor is performed so that the current mode is stopped and a parking or unloading mode is executed.

The counter-electromotive force of which operation is performed using the voice coil voltage and the position error signal, may be detected even in a large disturbance occurring in a low frequency region and even in a smaller disturbance occurring in a high frequency region.

Likewise, a counter-electromotive force is calculated using a voice coil voltage or a position error signal as a servo signal without installing an additional shock sensor in a disc drive, and the magnitude of an external shock or the magnitude of vibration is determined by the calculated counter-electromotive force. When the magnitude of an external shock or the magnitude of vibration determined by the counter-electromotive force exceeds a tolerance range of the disc drive, a current mode is automatically converted into a parking or unloading mode, and damage due to a collision between the transducer and the disc may be prevented.

As described above, according to the present invention, a counter-electromotive force is calculated using a voice coil voltage or a position error signal as a servo signal without installing an additional sensor to sense disturbance in a disc drive. In addition, the magnitude of an external shock or the magnitude of vibration are indirectly determined by the calculated counter-electromotive force, and the disc drive is thereby controlled such that malfunction due to a disturbance and damage due to a collision between a transducer and a disc are prevented. Further, a sensor to sense a disturbance is not needed such that costs are reduced compared to the related art. Further, disturbance is measured by the counter-electromotive force even during a track following mode moved with small displacement such that the disc drive is prevented from a small disturbance even while the track following and read/write mode are executed.

The present invention may be implemented by a method, an apparatus, and a system. When the present invention is implemented with a software unit, elements of the present invention are code segments to perform essential works. Programs or code segments may be stored in a processor readable medium or transmitted in response to computer data signals coupled with a carrier wave in a transmission medium or communication networks. The processor readable medium includes a certain medium on which information may be stored or transmitted. The processor readable medium includes an electronic circuit, a semiconductor memory device, a ROM, a flash memory, an erasable ROM, a floppy disc, an optical disc, a hard disc, an optical fiber medium, and a radio frequency (RF) network. The computer data signals include certain signals which may be transmitted on a transmission medium, such as electronic network channels, optical fibers, airs, electronic fields, and RF networks.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of controlling a disc drive using a counter-electromotive force, the method comprising:
   detecting a voltage applied to a voice coil during a predetermined mode;
   performing an operation of the value of the counter-electromotive force using the voice coil voltage;
   comparing the value of the counter-electromotive force operated with a predetermined threshold; and
   when the value of the counter-electromotive force is equal to or larger than the predetermined threshold, controlling a voice coil motor and a spindle motor so that a current mode is stopped and a parking or unloading mode is executed,
   wherein the predetermined mode is selected among a seek mode, a track following mode, a read mode, and a write mode.

2. The method as claimed in claim 1, wherein the counter-electromotive force e(t) is obtained by:

$$e(t) = v(t) - L \times \left(\frac{di}{dt}\right) - R \times i(t)$$

where, v(t) is a voltage detected from the voice coil, L is a reactance constant of the voice coil, R is a resistance toward the voice coil from a VCM driver, and i is current applied to the voice coil.

3. A method of controlling a disc drive using a counter-electromotive force, the method comprising:
   detecting a voltage applied to a voice coil during a predetermined mode;
   performing an operation of the value of the counter-electromotive force using the voice coil voltage;
   comparing the value of the counter-electromotive force operated with a predetermined threshold; and
   when the value of the counter-electromotive force is equal to or larger than the predetermined threshold, controlling a voice coil motor and a spindle motor so that a current mode is stopped and a parking or unloading mode is executed,
   wherein the predetermined threshold is calculated from a regression function corresponding to a statistical correlation between the magnitude of an external shock and the counter-electromotive force.

4. A method of controlling a disc drive using a counter-electromotive force, the method comprising:
   detecting a moving distance variation ΔLh/Δt of a transducer with respect to a variation in time during a predetermined mode;
   performing an operation of a value of the counter-electromotive force by applying the detected moving distance variation ΔLh/Δt of the transducer with respect to the variation in time to a predetermined counter-electromotive force calculation Equation;
   comparing the value of the counter-electromotive force with a predetermined threshold; and
   when the value of the counter-electromotive force is equal to or larger than the predetermined threshold, controlling a voice coil motor and a spindle motor so that a current mode is stopped and a parking or unloading mode is executed.

5. The method as claimed in claim 4, wherein the predetermined counter-electromotive force calculation Equation is $$e(t) = \left(\frac{Ke}{Rh}\right) \times \left(\frac{dLh}{dt}\right),$$

where, Ke is a counter-electromotive force constant, and Rh is a distance from a pivot bearing to a transducer.

6. The method as claimed in claim 4, wherein the predetermined mode is selected among a loading mode, a seek mode, a track following mode, a read mode, and a write mode.

7. The method as claimed in claim 4, wherein the predetermined threshold is calculated from a regression function corresponding to a statistical correlation between the magnitude of an external shock and the counter-electromotive force.

8. A disc drive, comprising:
   a disc having a surface;
   a spindle motor to rotate the disc;
   a transducer to write and read information in and from the disc;
   a voice coil motor to move the transducer; and
   a controller to control the spindle motor and the voice coil motor according to a set mode, and to perform a shock damage prevention process of controlling the voice coil motor and the spindle motor, so that a current mode is stopped and a parking or unloading mode is executed if a counter-electromotive force operation process of performing an operation of a value of a counter-electromotive force using a voltage detected from the voice coil and the value of the counter-electromotive force are equal to or larger than a predetermined threshold value,
   the voltage detected from the voice coil being determined according to a position error of the transducer.

9. The disc drive as claimed in claim 8, wherein the predetermined mode is selected among a loading mode, a seek mode, a track following mode, a read mode, and a write mode.

10. A disc drive, comprising:
    a disc having a surface;
    a spindle motor to rotate the disc;
    a transducer to write and read information in and from the disc;
    a voice coil motor to move the transducer; and
    a controller to control the spindle motor and the voice coil motor according to a set mode, and to perform a shock damage prevention process of controlling the voice coil motor and the spindle motor, so that a current mode is stopped and a parking or unloading mode is executed if a counter-electromotive force operation process of performing an operation of a value of a counter-electromotive force using a voltage detected from the voice coil and the value of the counter-electromotive force are equal to or larger than a predetermined threshold value,
    wherein the predetermined threshold is calculated from a regression function corresponding to a statistical correlation between the magnitude of an external shock and the counter-electromotive force.

11. A disc drive, comprising:
a disc having a surface;
a spindle motor to rotate the disc;
a transducer to write and read information in and from the disc;
a voice coil motor to move the transducer; and
a controller to control the spindle motor and the voice coil motor according to a set mode, and to perform a shock damage prevention process of controlling the voice coil motor and the spindle motor, so that a current mode is stopped and a parking or unloading mode is executed if a counter-electromotive force operation process of performing an operation of a value of a counter-electromotive force using a voltage detected from the voice coil and the value of the counter-electromotive force are equal to or larger than a predetermined threshold value,
wherein the controller further comprises:
a circuit to compensate signal delay between a driving signal to drive the voice coil motor and a voltage detection signal from the voice coil.

12. A disc drive, comprising:
a disc having a surface;
a spindle motor to rotate the disc;
a transducer to write and read information in and from the disc;
a voice coil motor to move the transducer; and
a controller to control the spindle motor and the voice coil motor according to a set mode, and using a moving distance variation $\Delta Lh/\Delta t$ of the transducer with respect to a variation in time detected during the set mode $\Delta t$, to perform a shock damage prevention process of controlling the voice coil motor and the spindle motor, so that a current mode is stopped and a parking or unloading mode is executed if a counter-electromotive force operation process of performing an operation of the value of a counter-electromotive force using a predetermined counter-electromotive force calculation Equation and the value of the counter-electromotive force of which operation is performed in the counter-electromotive force operation process are equal to or larger than a predetermined threshold value.

13. The disc drive as claimed in claim 12, wherein the predetermined counter-electromotive force calculation Equation is $$e(t) = \left(\frac{Ke}{Rh}\right) \times \left(\frac{dLh}{dt}\right),$$

where, Ke is a counter-electromotive force constant, and Rh is a distance from a pivot bearing to the transducer.

14. The disc drive as claimed in claim 12, wherein the predetermined mode is selected among a loading mode, a seek mode, a track following mode, a read mode, and a write mode.

15. The disc drive as claimed in claim 12, wherein the predetermined threshold is calculated from a regression function corresponding to a statistical correlation between the magnitude of an external shock and the counter-electromotive force.

16. A computer readable storage storing at least one program to control a disc drive using a counter-electromotive force according to a process comprising:

detecting a voltage applied to a voice coil during a predetermined mode;
performing an operation of the value of the counter-electromotive force using the voice coil voltage;
comparing the value of the counter-electromotive force operated with a predetermined threshold; and
when the value of the counter-electromotive force is equal to or larger than the predetermined threshold, controlling a voice coil motor and a spindle motor so that a current mode is stopped and a parking or unloading mode is executed,
wherein the predetermined mode is selected among a seek mode, a track following mode, a read mode, and a write mode.

17. The computer readable storage as claimed in claim 16, wherein the counter-electromotive force e(t) is obtained by:

$$e(t) = v(t) - L \times \left(\frac{di}{dt}\right) - R \times i(t)$$

where, v(t) is a voltage detected from the voice coil, L is a reactance constant of the voice coil, R is a resistance toward the voice coil from a VCM driver, and i is current applied to the voice coil.

18. A computer readable storage storing at least one program to control a disc drive using a counter-electromotive force according to a process comprising:
detecting a voltage applied to a voice coil during a predetermined mode;
performing an operation of the value of the counter-electromotive force using the voice coil voltage;
comparing the value of the counter-electromotive force operated with a predetermined threshold; and
when the value of the counter-electromotive force is equal to or larger than the predetermined threshold, controlling a voice coil motor and a spindle motor so that a current mode is stopped and a parking or unloading mode is executed,
wherein the predetermined threshold is calculated from a regression function corresponding to a statistical correlation between the magnitude of an external shock and the counter-electromotive force.

19. A computer readable storage storing at least one program to control a disc drive using a counter-electromotive force according to a process comprising:
detecting a moving distance variation $\Delta Lh/\Delta t$ of a transducer with respect to a variation in time during a predetermined mode;
performing an operation of a value of the counter-electromotive force by applying the detected moving distance variation $\Delta Lh/\Delta t$ of the transducer with respect to the variation in time to a predetermined counter-electromotive force calculation Equation;
comparing the value of the counter-electromotive force with a predetermined threshold; and
when the value of the counter-electromotive force is equal to or larger than the predetermined threshold, controlling a voice coil motor and a spindle motor so that a current mode is stopped and a parking or unloading mode is executed.

20. The computer readable storage as claimed in claim 19, wherein the predetermined counter-electromotive force calculation Equation is $$e(t) = \left(\frac{Ke}{Rh}\right) \times \left(\frac{dLh}{dt}\right),$$

where, Ke is a counter-electromotive force constant, and Rh is a distance from a pivot bearing to a transducer.

21. The computer readable storage as claimed in claim 19, wherein the predetermined mode includes a loading mode, a seek mode, a track following mode, a read mode, and a write mode.

22. The computer readable storage as claimed in claim 19, wherein the predetermined threshold is calculated from a regression function corresponding to a statistical correlation between the magnitude of an external shock and the counter-electromotive force.

23. A method of controlling a disc drive having a transducer and a disc by using a counter-electromotive force, the method comprising:

calculating the counter-electromotive force using a voice coil voltage or a position error signal without installing an additional shock sensor to sense disturbance in the disc drive;

determining a magnitude of an external shock or a magnitude of vibration by the calculated counter-electromotive force; and when the magnitude of an external shock or the magnitude of vibration determined by the counter-electromotive force exceeds a tolerance range of the disc drive, controlling the disc drive so that a current mode is automatically converted into a parking or unloading mode, preventing malfunctions of the disc drive due to collisions between the transducer and the disc.

\* \* \* \* \*

UNITED STATES PATENT AND TRADEMARK OFFICE
CERTIFICATE OF CORRECTION

PATENT NO. : 7,064,917 B2  Page 1 of 1
APPLICATION NO. : 10/649779
DATED : June 20, 2006
INVENTOR(S) : Sang-chul Shin It is certified that error appears in the above-identified patent and that said Letters Patent is hereby corrected as shown below:

TITLE PAGE, ITEM (56) (Foreign Patent Documents), above "JP 7-6488 1/1995" insert --JP 05-101573 4/1993--.

Signed and Sealed this

Twenty-first Day of November, 2006

JON W. DUDAS
*Director of the United States Patent and Trademark Office*